United States Patent
Morse et al.

(10) Patent No.: US 6,401,510 B1
(45) Date of Patent: Jun. 11, 2002

(54) METHOD FOR STAMPING A PART FROM A MULTI-LAYERED STRIP

(75) Inventors: Thomas L. Morse, Roseville; Alfred D. Nelson, Stillwater; Brian D. Johnson, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/331,814
(22) PCT Filed: Apr. 7, 1999
(86) PCT No.: PCT/US99/07608
§ 371 (c)(1),
(2), (4) Date: Jun. 25, 1999
(87) PCT Pub. No.: WO00/59725
PCT Pub. Date: Oct. 12, 2000
(51) Int. Cl.$^7$ ............................. B21D 28/10; B26D 3/08
(52) U.S. Cl. ............................. 72/327; 83/51; 83/621
(58) Field of Search ............................. 72/327; 83/51, 83/49, 621; 156/268, 250

(56) References Cited

U.S. PATENT DOCUMENTS

| | | | | |
|---|---|---|---|---|
| 3,470,773 A | * | 10/1969 | Mueller | ............ 83/51 |
| 3,492,853 A | * | 2/1970 | Gross | ............ 83/51 |
| 3,554,065 A | | 1/1971 | Kunz | |
| 3,583,266 A | | 6/1971 | Kondo | ............ 83/51 |
| 3,634,916 A | * | 1/1972 | Kinney | ............ 83/124 |
| 3,641,853 A | * | 2/1972 | Jungbeck | ............ 83/51 |
| 3,656,379 A | | 4/1972 | Clark | |
| 3,656,394 A | | 4/1972 | McCutcheon | ............ 83/689 |
| 3,707,896 A | * | 1/1973 | Kononenko | ............ 83/51 |
| 3,739,669 A | | 6/1973 | Seki | ............ 83/123 |
| 3,861,976 A | * | 1/1975 | Gayner | ............ 156/268 |
| 4,216,505 A | | 8/1980 | Grant et al. | |
| 4,374,795 A | | 2/1983 | Keilp et al. | ............ 83/55 |
| 4,501,177 A | | 2/1985 | Logan et al. | ............ 83/105 |
| 4,599,126 A | | 7/1986 | Duffield | |
| 5,263,353 A | | 11/1993 | Bakermans et al. | ............ 72/334 |
| 5,538,774 A | | 7/1996 | Landin et al. | |
| 5,702,556 A | | 12/1997 | Okuma et al. | ............ 156/250 |
| 5,967,009 A | * | 10/1999 | Truttmann | ............ 83/52 |

FOREIGN PATENT DOCUMENTS

| | | |
|---|---|---|
| DE | 195 13 282 A1 | 10/1996 |
| EP | 0 551 869 A | 7/1993 |
| GB | 653 195 A | 7/1949 |
| JP | 63-278617 | 11/1988 ............ B21D/28/02 |
| JP | 7-112396 | 5/1995 |
| WO | WO 86/00741 | 1/1986 |

OTHER PUBLICATIONS

Manufacturing Processes for Engineering Materials, Second Edition, Serope Kalpakjian, Illinois Institute of Technology, Addison–Wesley Publishing Company, 1991, pp. 403–503 and 548–565.
Handbook of Flexible Circuits, Ken Gilleo, Poly–Flex Circuits, Van Nostrand Reinhold, 1991, pp. 135–136.
Material–Removal Processes: Cutting Processes for Producing Various Shapes, pp. 548–565.

* cited by examiner

Primary Examiner—Daniel C. Crane
(74) Attorney, Agent, or Firm—Lisa M. McGeehan

(57) ABSTRACT

A method of stamping a part from an elongated strip of multi-layered material. The multi-layered material includes a viscoelastic intermediate layer, and upper and lower layers that are relatively rigid with respect to the intermediate layer. The method includes providing symmetrically aligned top and bottom punches each including a material displacement edge corresponding with a desired shape of the part. Each of the material displacement edges are defined by a rake surface and a part interface surface that combine to form a positive rake angle. The strip is positioned between the top and bottom punches. The top and bottom punches then shear a portion of the upper and lower layers, respectively. More particularly, symmetrical groove patterns are formed in the upper and lower layers, defining a perimeter of the part. The part is then removed from the strip along the perimeter.

22 Claims, 6 Drawing Sheets

METHOD FOR STAMPING A PART FROM A MULTI-LAYERED STRIP

This application is a 371 of PCT/US99/07608, filed Apr. 7, 1999.

FIELD OF THE INVENTION

The present invention relates to a multi-layered part and a method of producing a multi-layered part having relatively rigid upper and lower layers, and a viscoelastic intermediate layer. In a particular embodiment, it relates to a method and apparatus for stamping a flat, uniformly edged part from a multi-layered strip, including a viscoelastic intermediate layer, on a mass production basis.

BACKGROUND OF THE INVENTION

Several well-known techniques are normally employed for stamping or blanking parts from sheets or strips of material. Typically, the part is sheared or cut from the strip by subjecting the strip to shear stresses at desired locations. One common blanking device includes a punch and die or similar punch press tools. The punch and die is shaped in accordance with a desired shape of the end part, and may therefore assume a number of different shapes, including circular, rectangular, etc. Generally speaking, the material strip is placed between the punch and die, and the punch is driven toward the die. During this operation, the part is sheared from the strip along fracture lines imparted by the punch and the die. Other similar shearing techniques including die cutting, fine blanking, steel rules, etc.

While blanking operations via a conventional punch press or similar technique are widely accepted, inherent limitations of these shearing techniques normally impart certain imperfections into the resulting part. For example, with the standard punch/die approach, clearance between the punch and die is a major factor in determining the shape and quality of the sheared edge of the part. During the shearing process, actual shearing normally initiates with the formation of fractures or cracks at the interface areas between the part and the punch and the part and the die. These fractures define deformation zones and eventually meet, resulting in complete separation. With this in mind, the sheared edge of the part is typically neither smooth nor perpendicular to a plane of the strip. More particularly, as clearance increases, the edge of the part becomes rougher as the zone of deformation along the part edge becomes larger. Material is pulled into the clearance area, and the edge of the sheared part becomes more and more rounded. Additionally, burrs are normally formed at the bottom surface of the part. It may be possible to better control fracture formation by incorporating a cutting edge into the punch. However, even with relatively thin strip material, uncontrolled fractures along the sheared edge of the part will still result.

Depending upon the end application for the part, the above-described defects may be of little concern. For example, stainless steel washers are typically produced via a punching operation. For most applications, it is not necessary that the washer be extremely flat or have uniform inner and outer perimeter edges. Further, where flatness and edge uniformity is of greater importance, certain additional process controls can be implemented. For example, a fine blanking operation can be employed in which a V-shaped stinger, or impingement ring, locks the material sheet or strip tightly in place so as to minimize burr formation and facilitate a more uniform shear. Alternatively, additional manufacturing steps, such as rolling, flat baking, shaving, deburring, etc. may be employed.

One particular product normally produced using a punching operation is the disk substrate material for a rotatable storage article such as a computer hard disk. Disk substrates used in computer hard disk drives are typically mass produced by blanking a properly shaped part from a sheet of aluminum. Other materials are subsequently applied to opposing surfaces of the disk, such as plated nickel and sputtered magnetic material. However, the disk substrate itself is produced by a punch and die device. It is estimated that over one billion computer hard disks are produced annually. Obviously, it is imperative that the disk substrate be flat. In this regard, current industry standards require a flatness of less than 8 microns per 96 mm (one typical hard disk substrate diameter) or 5 microns per 84 mm (another typical disk diameter). To satisfy this rigorous standard, a stinger technique is normally employed to minimize burr formation. Further, following the blanking or stamping operation, the disk substrate is typically flat baked.

The above-described techniques achieve the requisite disk substrate flatness due to the monolithic nature of the sheet material. The monolithic aluminum material facilitates successful flat baking because the imperfections imparted during stamping are relatively uniform across the disk thickness. For most end applications, a monolithic or single layered aluminum disk substrate is more than satisfactory. However, as computer hard drive technology continues to evolve, the computer hard disk is subjected to increasing demands. For example, efforts have been made to increase the rotational speed of the hard disk. Hard drives normally spin at one constant speed. Typical speeds range from 3600 to 7200 revolutions per minute (rpm). With recent improvements to hard drive designs, rotational speeds well in excess of 10,000 rpm are available. At these rotational speeds, the disk will begin to flutter or vibrate in response to air drag and/or internal hard drive harmonics. The effects of harmonic motion are greatly increased at higher rotation speeds. Because the standard computer hard disk substrate is monolithic, any resonant vibration generated at a bottom surface of the disk substrate is transferred to, or propagates to, the upper surface (and vice-versa), potentially leading to reading/writing errors.

To overcome resonant vibrational issues, recent disk substrate designs have focused on providing an internal damping mechanism. This internal damping mechanism serves to absorb or damp resonant vibrations, thereby preventing vibration propagation and resulting reading/writing errors. One such computer hard disk substrate (or similar rotatable storage article) is described in U.S. Pat. No. 5,538,774 assigned to Minnesota Mining and Manufacturing Company of St. Paul, Minn. The described disk substrate includes at least one layer comprised of a viscoelastic material. The viscoelastic layer serves to damp resonant vibrations generated during use.

Incorporating a viscoelastic material within a computer hard disk substrate is a highly viable solution to the resonant vibration issue. However, certain manufacturing concerns may arise during mass production. One technique for producing a multi-layered disk substrate, or any other product incorporating relatively rigid outer layers and a viscoelastic intermediate layer, is to prepare each of the three or more layers independently. Once cut to a proper shape and size, the three or more layers are adhered to one another. In terms of mass production, this technique may be relatively time consuming. Further, difficulties may be encountered in properly aligning the layers. Conversely, the three or more layers may be formed into a continuous strip. An individual computer hard disk substrate or other component is then stamped from the strip in accordance with previously described stamping procedures. With conventional stamping techniques, the upper rigid layer effectively cuts at least a portion of the lower rigid layer. Unlike a monolithic part, however, it is exceedingly difficult to "correct" stamping-caused defects in a multi-layered part incorporating a viscoelastic intermediate layer. Because the viscoelastic intermediate layer is soft and deformable, the rigid outer layer material will easily deform at the interface area with the viscoelastic material. This internal deformation or deflection is more prevalent along perimeter edges of the part. Because the viscoelastic interface area is internally located, it appears to be extremely difficult to correct edge deflections via an external compressive force and/or flat baking. Thus, it may be difficult to meet flatness specifications of less than 8 microns per 96 mm on a mass production basis. Effectively, conventional stamping techniques result in an uneven sheared edge surface and unacceptable flatness deviations. Notably, these same problems will be evident not only in computer hard disk substrates, but also with any other multi-layered stamped part.

Implementation of a viscoelastic material layer between relatively rigid material layers presents substantial improvements to many currently-available products. However, manufacture of these products with known stamping techniques may cause unacceptable flatness deviations. Therefore, a substantial need exists for a method of stamping a uniform, flat part from a multi-layered strip.

SUMMARY OF THE INVENTION

One aspect of the present invention relates to a method of stamping a part from an elongated strip of multi-layered material, the multi-layered material including an upper layer, an intermediate layer and a lower layer. The intermediate layer is viscoelastic. The upper and lower layers are relatively rigid with respect to the intermediate layer. The method includes providing a stamping device having symmetrically aligned top and bottom punches. Each of the top and bottom punches includes a material displacement edge corresponding with a desired shape of the part. To this end, each of the material displacement edges are defined by a rake surface and a part interface surface. The rake surface and the part edge interface surface combine to form a positive rake angle. The strip is positioned between the top punch and the bottom punch such that the material displacement edge of the top punch is adjacent the upper layer, and the material displacement edge of the bottom punch is adjacent the lower layer. Portions of the upper and lower layers are then sheared by the top punch and the bottom punch, respectively. More particularly, the material displacement edge of the top punch passes through a portion of the upper layer to form an upper layer groove pattern. Similarly, the material displacement edge of the bottom punch passes through a portion of the lower layer to form a lower layer groove pattern. Each of the upper and lower layer groove patterns define a perimeter of the part. Finally, the part is separated from the strip. The so-produced part has a substantially uniform perimeter edge and is substantially flat.

Another aspect of the present invention relates to a method of stamping a part from elongated strip of multi-layered material. The multi-layered includes an upper layer, an intermediate layer and a lower layer. The intermediate layer is viscoelastic. The upper and the lower layer are relatively rigid with respect to the intermediate layer. The method includes forming a first groove in the upper layer, the first groove defining a perimeter of the part and having a depth less than a thickness of the upper layer. A second groove is formed in the lower layer. The second groove is symmetrical to the first groove and has a depth less than a thickness of the lower layer. In this regard, the first groove and the second groove are formed substantially simultaneously. Finally, the part is separated from the strip. The so-produced part has a substantially uniform perimeter edge and is substantially flat.

Yet another aspect of the present invention relates to a device for partially stamping a part from an elongated strip of multi-layered material. The multi-layered material includes an upper layer, an intermediate layer and a lower layer. The intermediate layer is viscoelastic. The upper layer and the lower layer are relatively rigid with respect to the intermediate layer. The device comprises a first punch, a second punch, a driving mechanism and a stop. The first punch includes a material displacement edge corresponding with a desired shape of the part. Further, the material displacement edge is defined by a rake surface and a part interface surface. The rake surface and the part interface surface combine to form a positive rake angle. The second punch includes a material displacement edge substantially identical to the material displacement edge of the first punch. The first punch and the second punch are arranged vertically such that the material displacement edges are symmetrically aligned. The driving mechanism is configured to force the first punch toward the second punch during a stamping operation. Finally, the stop is configured to control spacing between the material displacement edges during a stamping operation. More particularly, the stop controls the stamping operation such that a vertical spacing between the material displacement edges is preferably greater than a thickness of the intermediate layer.

Yet another aspect of the present invention relates to a part produced by any of the above-described inventions. In one preferred embodiment, the part is a rotatable storage article such as a computer hard disk substrate. Another related aspect of the present invention provides a disk substrate for use as a base component of a rotatable storage article. The disk substrate is defined by an outer perimeter edge and an inner perimeter edge. The disk includes an upper layer, a lower layer and an intermediate layer. The intermediate layer is disposed between the upper layer and the lower layer, and is viscoelastic. The upper and lower layers are relatively rigid with respect to the intermediate layer. Further, the upper layer, the lower layer and the intermediate layer are configured to be substantially planar and substantially parallel to one another from the outer perimeter edge to the inner perimeter edge.

DETAILED DESCRIPTION OF THE PREFERRED EMBODIMENTS

Figure 1A:
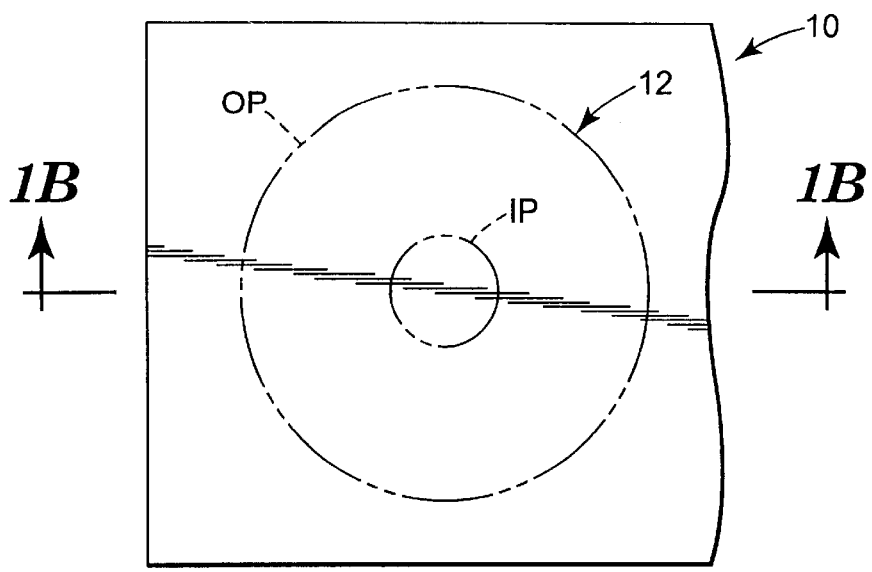
FIG. 1A is a top, partial view of a multi-layered material strip from which a part is stamped in accordance with the present invention.

The present invention relates to a method for stamping parts from a material strip, such as a strip 10 shown in FIG. 1A. The strip 10 is preferably elongated to facilitate mass production of parts. To this end, the strip 10 shown in FIG. 1A includes a part pattern 12 (shown with dashed lines). The part pattern 12 is representative of a part to be stamped from the strip 10 and may assume a wide variety of configurations and shapes. In one preferred embodiment, however, the part pattern 12 relates to a computer hard disk substrate, such as those used to prepare a rotatable storage article part, and, therefore, depicts a ring having a central hole. To this end, the part pattern 12 defines an outer perimeter OP and an inner perimeter IP. It should be understood that the part pattern 12 is shown in FIG. 1A for purposes of illustration only. Prior to processing in accordance with the present invention, the strip 10 preferably is continuous and does not include the part pattern 12.

Figure 1B:
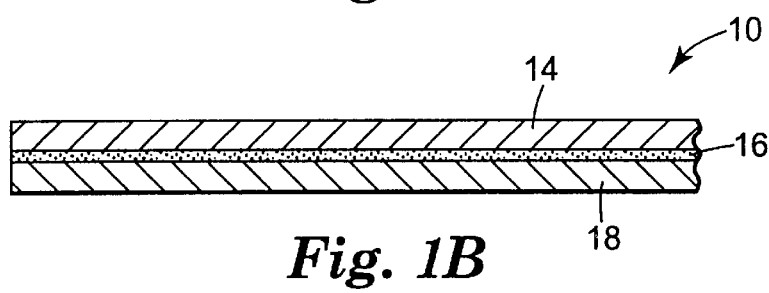
FIG. 1B is a cross-section view of the material strip of FIG. 1A along the line 1B—1B.

In a preferred embodiment, the strip 10 is multi-layered. For example, as shown in FIG. 1B, the strip 10 is comprised of an upper layer 14, an intermediate layer 16 and a lower layer 18. The intermediate layer 16 is viscoelastic.

The upper layer 14 and the lower layer 18 are preferably relatively rigid with respect to the intermediate layer 16. For example, the upper layer 14 and the lower layer 18 may be comprised of a metal material such as aluminum.

The intermediate layer 16 is preferably polymer-based or based on a similar material that is viscous, and therefore capable of dissipating energy, yet exhibits certain elastic properties, and therefore capable of storing energy. That is, a viscoelastic material is an elastomeric material typically containing long-chain molecules that can convert mechanical energy into heat when they are deformed. Suitable viscoelastic materials include: fluoropolymers, urethane rubbers, silicone rubbers, butyl rubbers, poly(meth) acrylates, polyesters, polyurethanes and polyamides to name but a few. Even further, an effective amount of a fibrous and/or particulate material may be combined with the viscoelastic material. With this configuration, the intermediate layer 16 serves as a damping layer relative to the upper layer 14 and the lower layer 18.

A part (not shown) stamped from the strip 10 may be highly useful for many applications, for example as a computer hard disk substrate (represented by the part pattern 12 in FIG. 1A), which can be used to prepare a rotatable storage article. Examples of acceptable materials for the intermediate layer 16 are provided in U.S. Pat. No. 5,538, 774, the teachings of which are incorporated herein by reference.

It should be understood that while the upper layer 14 and the lower layer 18 are shown as forming outer surfaces of the strip 10, additional materials or layers such as information storage layers or protective overcoat layers may be coated or otherwise adhered to the upper layer 14 and/or the lower layer 18. Similarly, additional material layer(s) and/or adhesives may be disposed between the upper layer 14 and the intermediate layer 16, and/or between the intermediate layer 16 and the lower layer 18.

As shown in FIG. 1B, the upper layer 14 and the lower layer 18 preferably have an identical thickness. Further, the intermediate layer 16 has a thickness less than a thickness of the upper layer 14 and the lower layer 18. Other thicknesses and thickness relationships for the upper layer 14, the intermediate layer 16 and/or the lower layer 18 may alternatively be provided.

Figure 2:
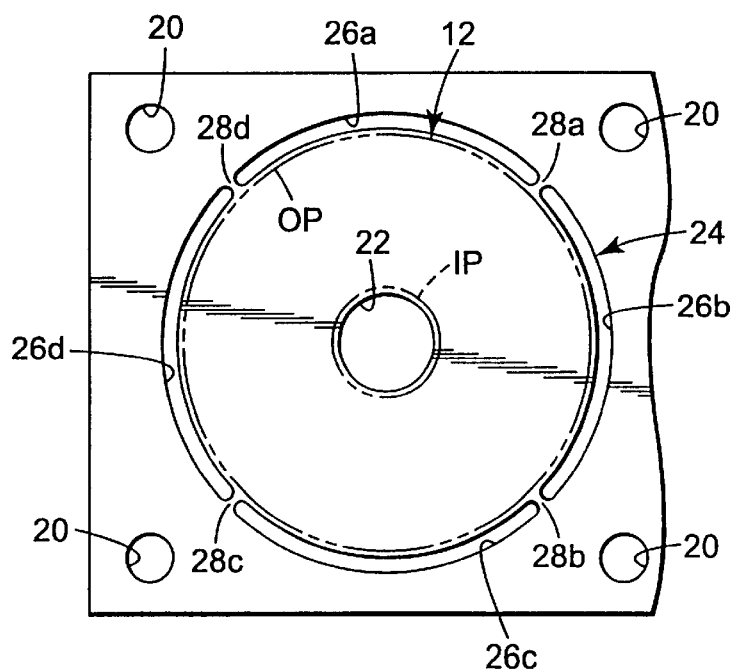
FIG. 2 is a top view of the strip of FIG. 1A processed to form pilot holes and a relief pattern.

With the above-described characteristics of the strip 10 in mind, production of a part (represented, for example, by the part pattern 12 in FIG. 1A) in accordance with one preferred embodiment of the present invention begins with a preliminary punching operation in which pilot holes 20, an inner relief pattern 22 and an outer relief pattern 24, shown generally in FIG. 2, are formed. It will be recalled that the part pattern 12, although not actually formed in the strip 10, is representative of a desired shape of a part. Any stamping or punching operations performed on the strip 10 must not, therefore, interfere with or otherwise damage material within the part pattern 12, as that material will make up the final part. Therefore, the pilot holes 20, the inner relief pattern 22 and the outer relief pattern 24 are positioned away from the inner perimeter IP and the outer perimeter OP, respectively, of the part pattern 12.

In a preferred embodiment, four of the pilot holes 20 are provided, although any other number is acceptable. The pilot holes 20 can be formed by a number of different manufacturing techniques, including, for example, a punching operation. The pilot holes 20 are preferably provided to facilitate movement of the strip 10 from one processing device to another, and to assist in properly aligning the strip 10 relative to a particular processing device.

The inner relief pattern 22 and the outer relief pattern 24 are formed adjacent the inner perimeter IP and outer perimeter OP, respectively, of the part pattern 12. Importantly, the inner relief pattern 22 and the outer relief pattern 24 are configured so as to not extend into or otherwise damage material of the strip 10 within the part pattern 12. In other words, the inner relief pattern 22 is slightly spaced from the inner perimeter IP; whereas the outer relief pattern 24 is slightly spaced from the outer perimeter OP.

In one preferred embodiment, where the part (represented, for example, by the part pattern 12) is a disk substrate for use as a base component of a computer hard disk, the inner relief pattern 22 is a hole formed within the inner perimeter IP. Alternatively, the inner relief pattern 22 may be a slot. Notably, certain parts (other than, for example, a ring) produced from the strip 10 may be continuous. With this design, only the outer perimeter OP need be formed, and the inner perimeter IP is eliminated. Stamping of a so-configured part does not require formation of the inner relief pattern 22.

The outer relief pattern 24 is shown in FIG. 2 as comprising a series of slots 26a–26d. Formation of the slots 26a–26d preferably leaves a plurality of tabs 28a–28d. The tabs 28a–28d are provided to "connect" material within the outer relief pattern 24 to the remainder of the strip 10. In other words, the tabs 28a–28d prevent the material within the outer relief pattern 24 from falling away from the remainder of the strip 10. While four of the tabs 28a–28d are depicted in FIG. 2, any other number, either greater or lesser, is acceptable. To facilitate subsequent processing described below, each of the tabs 28a–28d has a relatively small width, approximating a thickness of the strip 10. For example, with a strip 10 thickness of 0.81 mm (0.032 inch), each of the plurality of tabs 28a–28d has a width less than approximately 1 mm (0.04 inch), although other dimensions are acceptable.

The outer relief pattern 24 is positioned such that each of the slots 26a–26d are adjacent to, but slightly spaced from, the outer perimeter OP of the part pattern 12. As described in greater detail below, the outer relief pattern 24 is provided to facilitate displacement of material away from the part pattern 12 during subsequent processing. To this end, the slots 26a–26d are preferably spaced from the part pattern 12 by a distance approximately equal to a thickness of the strip 10.

The inner relief pattern 22 and the outer relief pattern 24 may be formed in a variety of fashions, such as with a punch press, router, etc. Further, the pilot holes 20, the inner relief pattern 22 and the outer relief pattern 24 may be formed simultaneously or at separate processing stations. For example, the pilot holes 20 and the inner relief pattern 22 may be formed initially, then the slots 26a and 26c, followed by the slots 26b, 26d. Regardless of the exact sequence, following the preliminary punching operation, the strip 10 can be guided to and aligned within subsequent processing stations by the pilot holes 20. Further, the inner relief pattern 22 and the outer relief pattern 24 facilitate displacement of material away from the part pattern 12.

Figure 3:
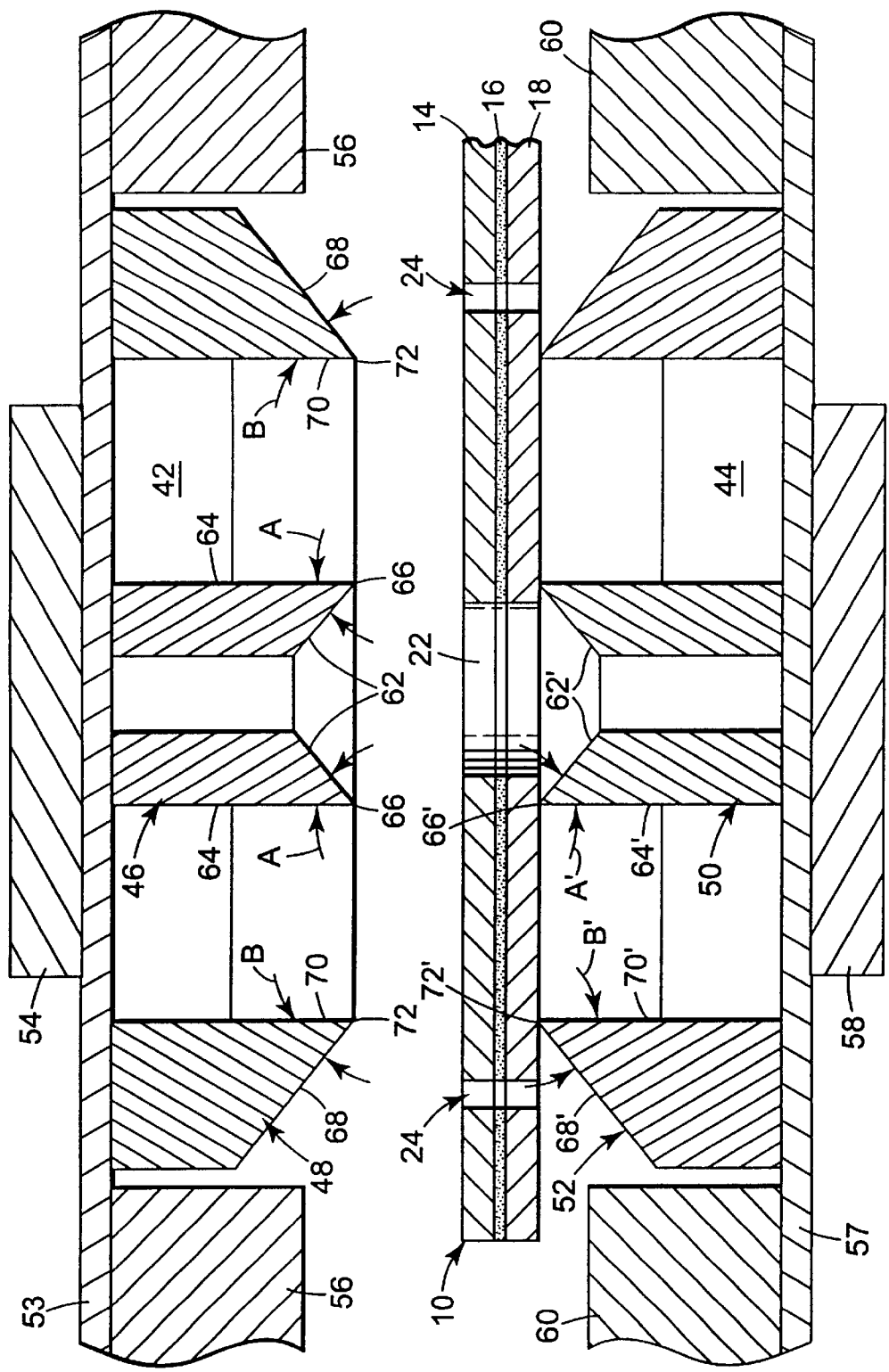
FIG. 3 is a schematic, cross-sectional view of a partial stamping device, including the strip of FIG. 2.

Following the preliminary punching operation, the strip 10 is processed through a partial stamping device, such as the partial stamping device 40 shown in FIG. 3. In general terms, the partial stamping device 40 includes a top punch 42 and a bottom punch 44. The top punch 42 includes an inner perimeter section 46 and an outer perimeter section 48. Similarly, the bottom punch 44 includes an inner perimeter section 50 and an outer perimeter section 52. In one preferred embodiment, the top punch 42 and the bottom punch 44 are each integrally formed and connected to an upper die shoe 53. The upper die shoe 53, in turn, is attached to a ram 54. The ram 54 is driven in a vertical fashion by a driving mechanism (not shown), such as a positive displacement motor. A stop block 56 extends from the ram 54 and is configured to limit vertical movement of the ram 54, and therefore the top punch 42, relative to the strip 10. With respect to the bottom punch 44, the inner perimeter section 50 and the outer perimeter section 52 are connected to a lower die shoe 57. The lower die shoe 57 is attached to a base 58. In one preferred embodiment, the base 58 is stationary. Further, a stop block 60 extends from the base 58 and is configured to limit vertical movement of the strip 10 relative to the bottom punch 44.

The top punch 42 is configured to generate a cut or groove pattern in the strip 10 corresponding with a desired shape of the final part (not shown). Thus, where the part (represented, for example, by the part pattern 12 of FIG. 2) is a ring for use as a computer hard disk substrate, the inner perimeter section 46 is sized in accordance with the inner perimeter IP (FIG. 2); whereas the outer perimeter section 48 is sized in accordance with the outer perimeter OP (FIG. 2). To this end, the inner perimeter section 46 includes a rake surface 62 and a part interface surface 64 that combine to form a material displacement edge 66. Similarly, the outer perimeter section 48 includes a rake surface 68 and a part interface surface 70 that combine to form material displacement edge 72. As shown in FIG. 3, the part interface surfaces 64, 70 are substantially vertical so as to be perpendicular to a plane of the strip 10. Conversely, the rake surface 62, 68 extends in an angular fashion from the respective part interface surface 70, defining a positive rake angle A, B. The rake angle A, B is preferably in the range of approximately 20°–70°; more preferably about 40°–50°; and most preferably about 45°.

As described in greater detail below, the material displacement edges 66, 72 are each configured to shear a portion of the strip 10 to define a perimeter of the part (represented, for example, by the part pattern 12 of FIG. 2).

Thus, where the part is a ring, the material displacement edges 66, 72 of the inner perimeter section 46 and the outer perimeter section 48, respectively, are circular. In this regard, the material displacement edge 72 of the outer perimeter section 48 defines a diameter larger than that of the inner perimeter section 46. Alternatively, the material displacement edges 66, 72 may assume any other shape in accordance with a desired shape of the final part. Thus, the material displacement edges 66, 72 may form a square, rectangle, a curvilinear shape, etc. Notably, as described above, where the part does not include a central hole, the inner perimeter section 46 is eliminated.

The components of the inner perimeter section 46 and the outer perimeter section 48, including the rake surfaces 62, 68, the part interface surfaces 64, 70 and the material displacement edges 66, 72, have been described as preferably being identical. It should be understood, however, that the inner perimeter section 46 and the outer perimeter section 48 may differ in design. For example, the rake angle A associated with the inner perimeter section 46 may vary from the rake angle B associated with the outer perimeter section 48. Further, the material displacement edges 66, 72 may form different shapes.

During use, the rake surfaces 62, 68 are configured to direct material displaced by the material displacement edges 66, 72, respectively, away from the part interface surfaces 64, 70. In this regard, while the rake surfaces 62, 68 are shown as being linear, the rake surfaces 62, 68 may instead incorporate one or more additional angles or curvilinear configurations. The part interface surfaces 64, 70, on the other hand, are preferably vertical (relative to the strip 10) so to define a substantially straight, substantially uniform perimeter of the part (not shown).

The bottom punch 44 is preferably identical to the top punch 42. Thus, the inner perimeter section 50 includes a rake surface 62' and a part interface surface 64' that combine to define a material displacement edge 66'. The material displacement edge 66' forms a positive rake angle A' identical to the rake angle A. Similarly, the outer perimeter section 52 includes a rake surface 68' and a part interface surface 70' that combine to define a material displacement edge 72'. The material displacement edge 72' forms a positive rake angle B' identical to the rake angle B. As shown in FIG. 3, the bottom punch 44 is vertically aligned below the top punch 42. With this configuration, the top punch 42 and the bottom punch 44 are symmetrical. More particularly, the material displacement edges 66, 66' associated with the inner perimeter sections 46, 50 are symmetrically aligned and the material displacement edges 72, 72' of the outer perimeter sections 48, 52 are symmetrically aligned.

The top punch 42 and the bottom punch 44 are formed from a hardened material, such as C.P.M. (Crucible Particle Metallurgy) tool steel available from Crucible Materials Corp. of Camillus, N.Y. or other conventional steel making methods. Alternatively, other hardened materials commonly associated with sheet metal stamping tools are also useful.

In a preferred embodiment, the partial stamping device 40 further includes a retention apparatus (not shown) for retaining the strip 10 relative to the punches 42, 44 during the partial stamping operation. For example, the retention apparatus may include a metal stripper block and a rubber block associated with the punches 42, 44. More particularly, a block of rubber material, such as urethane rubber, is nested between the inner perimeter section 46 and the outer perimeter section 48 of the top punch 42, abutting the upper die shoe 53. A metal stripper block is likewise nested between the inner and outer perimeter sections 46, 48, abutting the rubber block. Prior to use, the metal stripper block extends slightly beyond the material displacement edges 66, 72. A similar rubber/metal stripper block arrangement is provided for the bottom punch 44. During the partial stamping operation (described in greater detail below), as the top punch 42 and the bottom punch 44 are directed toward one another, the metal stripper blocks engage the strip 10 on opposite sides. The rubber blocks will compress slightly such that the material displacement edges 66, 66', 72, 72' can engage the strip 10. However, metal stripper blocks apply a constant pressure on to the strip 10, via the rubber blocks, to hold the strip 10 flat. Alternatively, a spring-based mechanism or similar device may be employed to retain the strip 10 during partial stamping.

With the above description of the partial stamping device 40 in mind, the strip 10 is disposed between the top punch 42 and the bottom punch 44. In one preferred embodiment, the strip 10 is placed on top of the material displacement edges 66', 72' of the bottom punch 44. The stamping device 40 is then operated through a partial stamping operation. More particularly, the stamping device 40 is directed from an initial position (shown in FIG. 3) in which a vertical spacing between the material displacement edges 66, 72 of the top punch 42 and the material displacement edges 66', 72' of the bottom punch 44 is greater than a thickness of the strip 10, to an engaged position in which the material displacement edges 66, 66', 72, 72' engage the strip 10. The strip 10 is effectively pinched between the top punch 42 and the bottom punch 44. For example, in one preferred embodiment, the ram 54 is actuated so as to drive the top punch 42 toward the bottom punch 44. Alternatively, the bottom punch 44 may be mechanically driven toward the top punch 42. Even further, both of the top punch 42 and the bottom punch 44 may include an auxiliary driving device, independently driving the top punch 42 and the bottom punch 44 toward one another.

Figure 4:
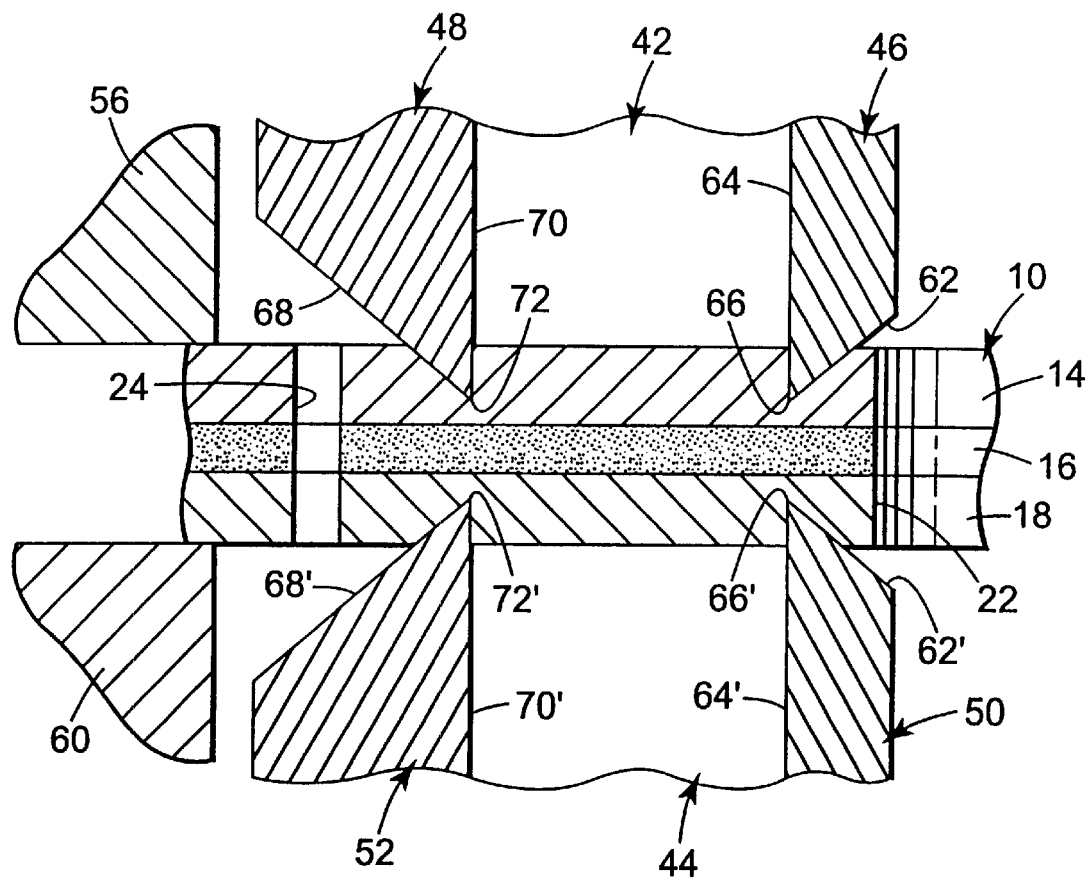
FIG. 4 is a cross-sectional view of the arrangement of FIG. 3 in a partial stamping operation.

During the partial stamping operation, the material displacement edges 66, 66', 72, 72' preferably substantially simultaneously contact and pass through a portion of the upper layer 14 and the lower layer 18, respectively, as shown in FIG. 4. In the preferred embodiment, the top punch 42 is directed toward the bottom punch 44 such that the material displacement edges 66, 72 contact the upper layer 14. Further vertical movement of the top punch 42 drives the material displacement edges 66, 72 into the upper layer 14. Additionally, the force generated by the top punch 42 on the strip 10 causes the strip 10 to move downwardly such that the material displacement edges 66', 72' of the bottom punch 44 pierce and pass through a portion of the lower layer 18. This stamping or shearing action of the top punch 42 and the bottom punch 44 into the strip 10 occurs simultaneously, such that the strip 10 is pinched by the top punch 42 and the bottom punch 44.

During the stamping operation, the top punch 42 and the bottom punch 44, and in particular the part interface surfaces 64, 64', 70, 70' define perimeters of the final part (represented for example, by the part pattern 12 of FIG. 2). Material of the strip 10 is directed away from the part interface surfaces 64, 64', 70, 70' by the rake surfaces 62, 62', 68, 68' associated with each of the top punch 42 and the bottom punch 44, respectively. For example, the rake surface 68 of the outer perimeter section 48 directs material of the upper layer 14 away from the part interface surface 70, toward the outer relief pattern 24, with downward movement of the top punch 42. Similarly, the rake surface 62 of the inner perimeter section 46 directs material of the upper layer 14 away from the part interface surface 64, toward the inner relief pattern 22. The inner and outer perimeter sections 50, 52 of the bottom punch 44 deform the lower layer 18 in a virtually identical fashion. Notably, by providing the inner relief pattern 22 and the outer relief pattern 24, resistance to desired vertical movement of the material displacement edges 66 relative to the strip 10 is greatly reduced, thereby increasing the number of stamping cycles available for the particular material displacement edge 66 before sharpening is required. Further, because the rake surfaces 62, 62', 68, 68' direct material away from the part interface surfaces 64, 64', 70, 70', few, if any, burrs are formed along the part perimeter.

Stamping of the upper layer 14 and the lower layer 18 by the material displacement edges 66, 66', 72, 72' continues until the stop blocks 56, 60 contact the strip 10. Alternatively, other stopping configurations may be provided. As shown in FIG. 4, at the stop position, the material displacement edges 66, 66', 72, 72' of the top punch 42 and the bottom punch 44, respectively, are vertically spaced by a distance greater than a thickness of the intermediate layer 16. That is to say, the material displacement edges 66, 66', 72, 72' do not contact the intermediate layer 16. Further, at least a portion of the upper layer 14 and the lower layer 18 is not sheared by the material displacement edges 66, 66', 72, 72'.

In a preferred embodiment, the partial stamping operation results in the material displacement edges 66, 66', 72, 72' being approximately centered about the intermediate layer 16. Preferably, the material displacement edges 66, 66', 72, 72' project into the upper layer 14 and the lower layer 18, respectively, a distance of at least two-thirds a thickness of the upper layer 14 and the lower layer 18, respectively; more preferably four-fifths the thickness of the upper layer 14 and the lower layer 18. For example, where the upper layer 14 and the lower layer 18 have a thickness of 0.40 mm, each of the material displacement edges 66, 66', 72, 72' projects into the upper layer 14 and the lower layer 18, respectively, a distance of approximately 0.35 mm. Because each of the rake surfaces 62, 62', 68, 68' and the respective part interface surfaces 64, 64', 70, 70' forms an acute angle (as opposed to a flat punch), the partial stamping operation does not generate a major fracture within the strip 10. Further, any fracture caused by one of the material displacement edges (for example, the material displacement edge 66) will be offset by a similar fracture imparted by the symmetrically opposing material displacement edge (for example, the material displacement edge 66').

Figure 5A:
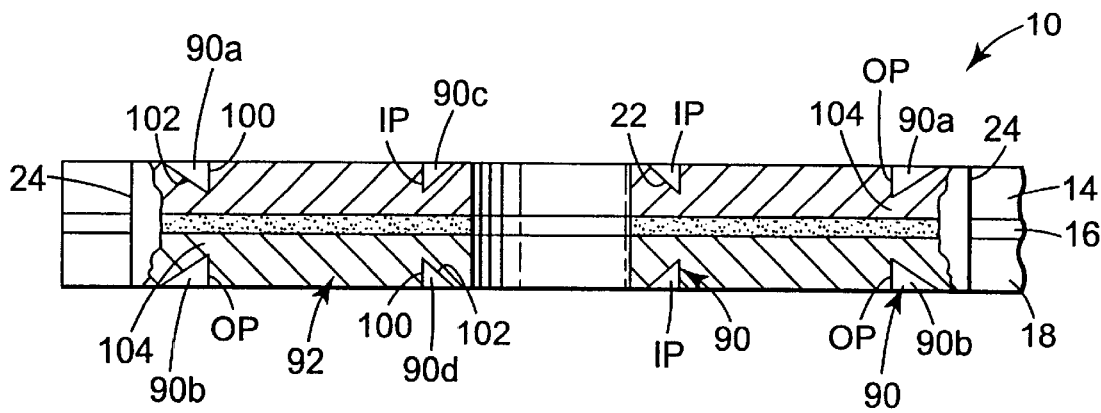
FIG. 5A is a cross-sectional view of the strip of FIG. 2 following a partial stamping operation.

Following the partial stamping operation, the strip 10 is removed from the top punch 42 and the bottom punch 44. As shown in FIG. 5A, the strip 10 has a groove or cut pattern 90 formed by the top punch 42 and the bottom punch 44 (FIG. 4). The grooves 90 define a part 92 (corresponding in shape and size with the part pattern 12 shown in FIG. 2). For example, the strip 10 has an outer groove 90a formed in the upper layer 14 defining the outer perimeter OP of the part 92 (shown generally in FIG. 5A). A virtually identical outer groove 90b is formed in the lower layer 19, again defining the outer perimeter OP of the part 92. Where the part 92 is a disk substrate shaped as a ring, the strip 10 will further include an inner groove 90c formed in the upper layer 14 defining the inner perimeter IP of the part 92. A virtually identical inner groove 90d is formed in the lower layer 18, defining the inner perimeter IP of the part 92.

Figure 5B:
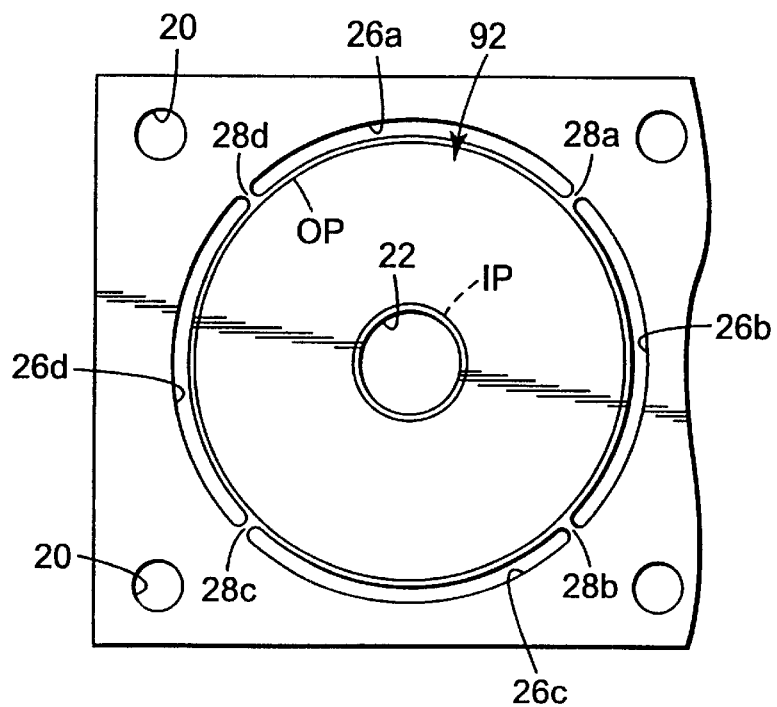
FIG. 5B is a top view of the strip of FIG. 5A.

Each of the grooves 90a–90d is defined by a leading side 100 and a trailing side 102. The leading side 100 is perpendicular to a plane of the strip 10, whereas the trailing side 102 extends angularly from the leading side 100 in accordance with orientation of the rake surface 62, 62', 68, 68' (FIG. 3) previously described. With this orientation in mind, the leading side 100 defines a perimeter of the part 92. Importantly, in preferred embodiments, the grooves 90a–90d do not extend into the intermediate layer 16. With respect to the outer grooves 90a–90b, a small retention web 104 remains between the grooves 90a–90b. The retention web 104 serves to connect the part 92 to the remainder of the strip 10. More particularly, as shown best in FIG. 5B, the tabs 28a–28d are connected to the retention web 104 (FIG. 5A) which in turn is connected to the part 92. Additionally, each of the tabs 28a–28d are connected to a remainder of the strip 10. Thus, following the partial stamping operation, the strip 10 can be maneuvered to a separate location (such as, for example, by the pilot holes 20) without having the part 92 entirely disengage from the strip 10. Because the intermediate layer 16 is preferably viscoelastic, the retention web 104 includes a portion of the upper layer 14 and the lower layer 18 to provide a relatively rigid connection between the part 92 and the tabs 28a–28d.

Figure 6:
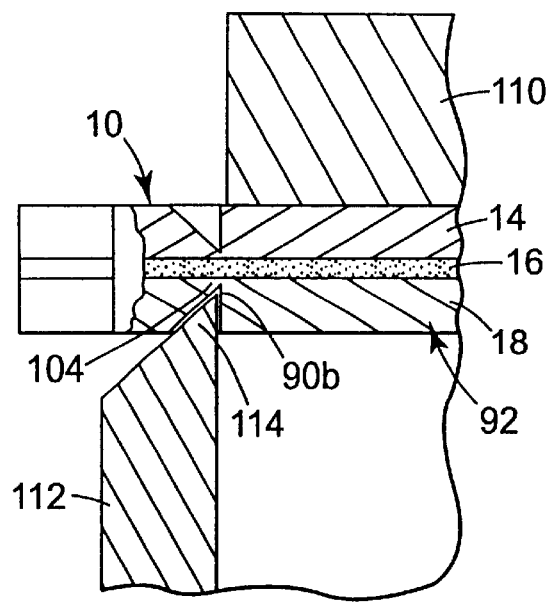
FIG. 6 is a schematic illustration of a punch procedure.

The strip 10 is then preferably moved to a punch-out station at which the part 92 is removed from the strip 10, as shown in FIG. 6. In one preferred embodiment, the punch-out station includes a punch 110 and a die 112. For purposes of illustration, only a portion of the punch 110 and the die 112 are shown in FIG. 6. The punch 110 is preferably a flat punch; whereas the die 112 preferably includes shearing edges 114 (one of which is shown in FIG. 6) sized in accordance with the grooves 90b, 90d (FIG. 5A) previously described. The strip 10 is placed onto the die 112 such that the shearing edges 114 engage the grooves 90b, 90d (only the groove 90b is shown in FIG. 6). The punch 110 is then driven downwardly toward the die 112, engaging the upper layer 14 of the strip 10. Further downward movement of the punch 110 causes the shearing edges 114 to shear the retention web 104 along perimeters (such as the outer perimeter OP shown in FIG. 6) of the part 92. Because the retention web 104 is relatively thin, the requisite shearing action does not result in formation of major fractures that might otherwise affect edge integrity of the part 92.

Figure 7A:
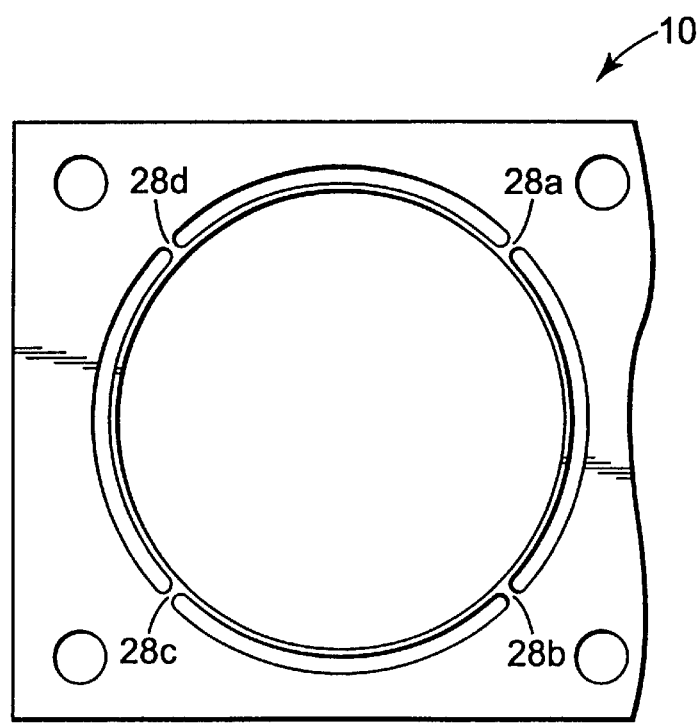
FIG. 7A is a top view of the material strip of FIG. 5A following the punch procedure.
Figure 7B:
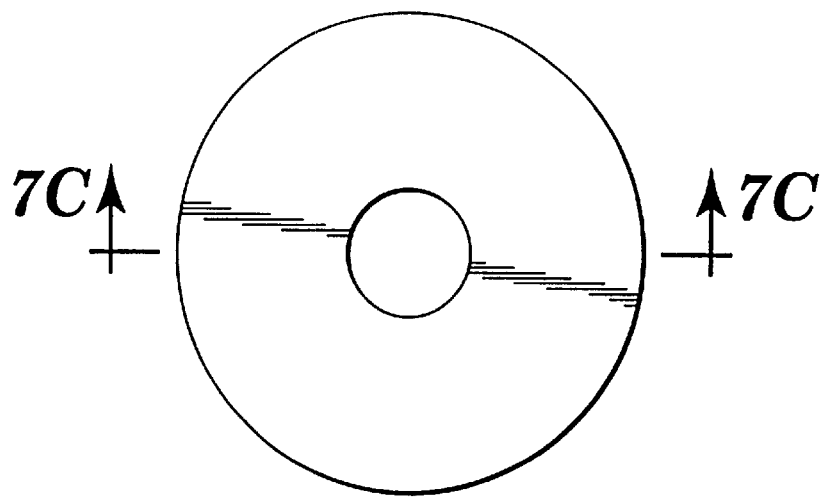
FIG. 7B is a top view of a part sheared from the strip of FIG. 7A.
Figure 7C:
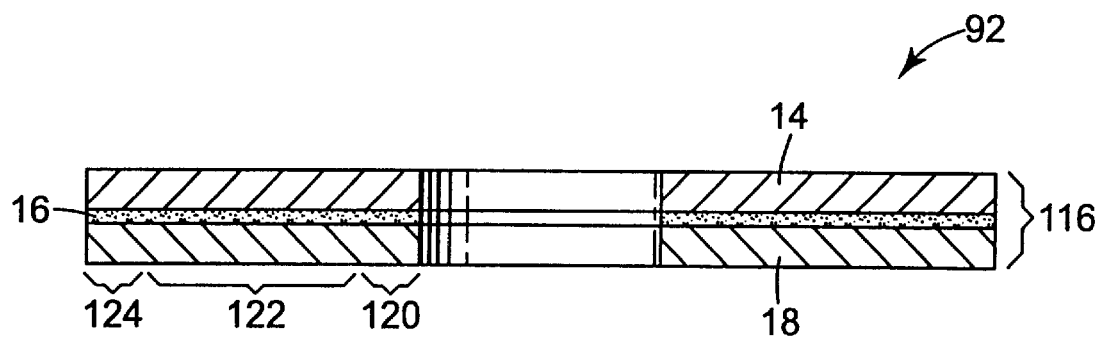
FIG. 7C is a cross-sectional view of the part of FIG. 7B.

Following the punch-out operation, the part 92 is removed from the strip 10. As shown in FIG. 7A, the retention web 104 remains connected to the strip 10 via the tabs 28a–28d. One example of the part 92 is shown in FIG. 7B. The above-described stamping procedure results in a highly uniform perimeter edge 116 of the part 92, as shown in FIG. 7C. It should be understood that FIG. 7C depicts the edge 116 of the outer perimeter OP (FIG. 7B). Where the part 92 is a disk substrate shaped as a ring for use as a base component of a computer hard disk, the inner perimeter IP (FIG. 7B) edge is similarly uniformly formed. The upper layer 14, the intermediate layer 16 and the lower layer 18 are substantially uniform along the edge 116 and do not include burrs. Thus, the part 92 is highly flat. In this regard, as shown in FIG. 7C, each of the upper layer 14, the intermediate layer 16 and the lower layer 18 are substantially planar, and as a result extend from the perimeter edge 116 in a substantially parallel fashion. Although the intermediate layer 16 is viscoelastic, the method of the present invention virtually eliminates edge deflections in the intermediate layer 16. More particularly, the intermediate layer 16 of the part 92 can be defined generally by an inner perimeter portion 120, a central portion 122 and an outer perimeter portion 124. With reference to FIGS. 7B and 7C, the inner perimeter portion 120 extends from the inner perimeter edge IP to the central portion 122; whereas the outer perimeter portion 124 extends from the outer perimeter edge OP to the central portion 122. With respect to the orientation of FIG. 7C, the central portion 122 defines a substantially uniform horizontal plane. Invariably, some vertical deflection of the inner perimeter portion 120 and/or the outer perimeter portion 124 relative to the plane of the central portion 122 may occur. However, the part 92 manufactured in accordance with the present invention will exhibit a deflection of the inner perimeter portion 120 and/or the outer perimeter portion of less than approximately 25 microns; preferably less than about 15 microns; more preferably less than about 10 microns; and most preferably less than about 5 microns.

Due to the uniform edges (such as the edge 116), the part 92 can be further processed to achieve an even higher degree of flatness. For example, the part 92 can be flat baked to a flatness of less than about 8 microns per 96 mm.

The method of stamping a part from an elongated strip of multi-layered material in accordance with the present invention provides a marked improvement over previous techniques. Unlike a standard punch and die or stinger procedure, the method of the present invention produces a part having a highly uniform perimeter edge and does not deform the viscoelastic intermediate layer. Further, by incorporating a device configured to simultaneously form symmetrical grooves on opposite sides of the strip, the overall life of the device is greatly enhanced.

EXAMPLES

The invention has been described with reference to various specific and preferred embodiments and will be further described by reference to the following detailed examples. It is understood, however, that there are many extensions, variations, and modifications on the basic themes of the present invention beyond that shown in the examples and detailed description, which are within the spirit and scope of the present invention. To facilitate a more ready understanding of the examples, reference to elements identified in the previously described figures has been provided where possible.

Description of Samples

A strip 10 of a viscoelastic intermediate layer 16 between two relatively rigid outer layers 14, 18 was prepared as follows:

The intermediate layer 16 of viscoelastic material, in particular a fluoropolymer (available under the trade designation, FLUOREL FT-2481), available from Dyneon LLC, St. Paul, Minn. was unwound from a roll and supplied to a nip roller simultaneously with the lower layer 18 of 0.41 mm (0.016 inch) thick by 104.8 mm (4.125 inch) wide clean, preheated aluminum (available from Kobe Precision, Hayward, Calif.) so that the lower layer 18 was joined to the intermediate layer 16. The upper layer 14 of 0.41 mm (0.016 inch) thick by 104.8 mm (4.125 inch) wide clean, preheated aluminum was laid on top of the exposed surface of the intermediate layer 16 and the three layers 14, 16, 18 were passed through a second nip roller at pressure setting of 0.48 to 0.55 MPa (70 to 80 psi) to form the strip 10. The strip 10 was wound up on a core and stored.

The strip 10 prepared above was unwound from its core, passed through a metal straightener (available under the trade designation, BENCHMASTER 910, available from Benchmaster Manufacturing Co., Gardena, Calif.), and cut into 1.22 meter (4 feet) lengths.

A 1.22 meter length of the strip 10 was then passed under a punch adjusted with stop blocks to stamp the pilot holes 20, a portion of the outer relief pattern 24 including two opposing 4.76 mm (³⁄₁₆ inch) wide curved slots 26a and 26c, 84.985 mm (3.3459 inches) apart, and the inner relief pattern 22 in the form of a 24 mm (0.9450 inch) diameter hole. At a second stamping station, the remaining portion of the outer relief pattern 24, including two opposing 4.76 mm (³⁄₁₆ inch) wide curved slots 26b and 26d, was stamped in the strip 84.985 mm (3.3459 inches) apart. A-2 tool steel punches were used. Press tonnage was 909 to 45,455 kilograms (10 to 50 tons).

The strip 10 proceeded to the partial stamping station which consisted of a stationary bottom punch 44 and a movable top punch 42. The top punch 42 and the bottom punch 44 were sized to partially punch a disk-shaped part having an outer diameter of 84.76 mm (3.337 inch) and a central hole having a diameter of 23.7 mm (0.935 inch). The top punch 42 and bottom punch 44 penetrated the strip approximately simultaneously to a depth such that the distance between the material displacement edges 72 and 72', and 66 and 66' were slightly less than 20% of the total thickness of the strip 10 (e.g., about 0.10 to 0.15 mm (4 to 6 mils)). In this manner, the strip 10 was partially stamped with the outer groove patterns 90a, 90b formed about and defining the outer perimeter OP and the inner groove patterns 90c, 90d formed about and defining the inner perimeter IP.

The strip 10 was then moved to a punch-out station where punch 110 and die 112 were used to punch-out the disk shaped part (or disk substrate) 92 from the retention web 104. The punch 110 had a 84.76 mm (3.337 inch) outer diameter and a 23.7 mm (0.935 inch) outer diameter center hole and the die 112 had a 85.52 mm (3.367 inch) outer diameter and a 24.5 mm (0.965 inch) outer diameter center hole.

The disk shaped part 92 (hereinafter referred to as "disk") prepared above was cleaned with acetone and stacked on a fixture. The fixture consisted of a 254 mm×254 mm×25.4 mm (10 inches×10 inches×1 inch) steel plate, two round aluminum spacers [31.75 mm (1.25 inches) thick and 101.6 mm (4 inches) in diameter with 19.48 mm (0.767 inches) diameter center hole], one round steel spacer [25.4 mm (1.0 inches) thick and 101.6 mm (4 inches) in diameter with a 19.48 mm (0.767 inches) diameter center hole], and a threaded steel rod. Approximately eight to twelve disk shaped parts were stacked onto the steel rod with an aluminum spacer on either side. The steel rod was threaded/anchored in the bottom steel plate. The spacers were drawn together by the steel rod, compressing the aluminum disks, and torqued to 11.29 Newton-meters (100 inch-pounds). Tension was maintained by a spring, spring spacer, and nut. The compressed stack of disks was placed in an air circulating oven set at 320° C. (608° F.) for up to 18 hours. The heat was turned off and the oven cooled for at least 2 hours by opening the open doors. The disks were removed from the fixture for testing.

A disk prepared according to the above procedure was tested for flatness using a MESA HORIZONTAL test apparatus, available from Zygo Corporation, Middlefield, Conn. A computer program (MetroPro™ PC Version OMP-0398C) modified for a hard drive disk was used. Peak to valley (PV) measurements were taken at 70,000 points and averaged. Measurements were taken on each side of the disk (e.g., side A and side B). The flatness was reported as the average peak to valley measurement in microns.

Example 1

Ten disks were prepared according to the above procedure using 0.0127 mm (0.5 mils) fluoropolymer (available under the trade designation, FLUOREL FT-2481, available from Dyneon LLC, St. Paul, Minn.) and with the exception that the stack of disks was cooled in the oven for two days.

Each disk was tested for flatness according to the test method outlined above. The flatness is reported in Table 1 below. There were no visible edges burrs and the edge cut was approximately vertical.

TABLE 1

| Disk Number | PV, Side A, microns | PV, Side B, microns |
| --- | --- | --- |
| 1 | 3.5 | 3.4 |
| 2 | 4.9 | 2.8 |
| 3 | 3.6 | 3.8 |
| 4 | 3.8 | 2.5 |
| 5 | 2.7 | 3.3 |
| 6 | 3.4 | 3.7 |
| 7 | 2.9 | 2.8 |
| 8 | 3.1 | 2.9 |
| 9 | 2.7 | 3.4 |
| 10 | 3.3 | 4.9 |
| Average Value | 3.4 | 3.4 |

Example 2

Eight disks were prepared according to the above procedure using 0.006 mm (0.25 mils) fluoropolymer (available under the trade designation, FLUOREL FT-2481, available from Dyneon LLC, St. Paul, Minn.) and with the exception that the stack of disks was removed from the oven and cooled for 24 hours.

Each disk was tested for flatness according to the test method outlined above. The flatness is reported in Table 2 below. There were no visible edges burrs and the edge cut was approximately vertical.

TABLE 2

| Disk Number | PV, Side A, microns | PV, Side B, microns |
| --- | --- | --- |
| 1 | 5.9 | 6.0 |
| 2 | 6.5 | 5.9 |
| 3 | 4.3 | 4.5 |
| 4 | 4.6 | 4.1 |
| 5 | 4.5 | 4.9 |
| 6 | 4.0 | 4.5 |
| 7 | 4.5 | 5.4 |
| 8 | 5.8 | 5.6 |
| Average Value | 5.0 | 7.1 |

Although the present invention has been described with reference to preferred embodiments, workers skilled in the art will recognize that changes may be made in form and detail without departing from the spirit and scope of the present invention. For example, the method of the present invention has been described as producing a disk substrate shaped as a ring for use as a computer hard disk. Other rotatable storage article applications such as DVD, magnetic, optical, magneto optical and mechanical are also suitable. Further, a wide variety of other shapes and end uses unrelated to rotatable storage articles are equally acceptable. Along these same lines, the resulting part need not incorporate a central hole. Further, while the method of the present invention has been described with reference to a three-layered material strip, a larger number of material layers can be incorporated. Each of these additional layers may be relatively rigid or may be viscoelastic. Additionally, while the described method has incorporated separate "stations" for performing the partial stamping and punch-out operations, a single station configured to perform both operations can be provided. Even further, the punch-out operation can be eliminated such that the described top and bottom punches associated with the partial stamping device are operated to separate the part from the strip with a single stamping motion.

What is claimed is:

1. A method of stamping a part from an elongated strip of multi-layered material, the multi-layered material including an upper layer, an intermediate layer and a lower layer, the intermediate layer being viscoelastic and the upper and lower layers being relatively rigid with respect to the intermediate layer, the method including:

providing a stamping device having symmetrically aligned top and bottom punches, each of the top and bottom punches including a material displacement edge corresponding with a desired shape of the part and defined by a rake surface and a part interface surface that combine to form a positive rake angle;

positioning the strip between the top and bottom punches such that the material displacement edge of the top punch is adjacent the upper layer and the material displacement edge of the bottom punch is adjacent the lower layer;

shearing the upper and lower layers with the top punch and the bottom punch, respectively, wherein the material displacement edge of the top punch passes through a portion of the upper layer to form an upper layer groove pattern and the material displacement edge of the bottom punch passes through a portion of the lower layer to form a lower layer groove pattern, each of the upper and lower groove patterns defining a perimeter of the part; and separating the part from the strip, the part having a substantially uniform perimeter edge.

2. The method of claim 1, wherein the top punch and the bottom punch shear the upper and lower layers, respectively, substantially simultaneously.

3. The method of claim 2, wherein simultaneously shearing includes:

controlling the stamping device such that the material displacement edge of the top punch does not contact the intermediate layer and the material displacement edge of the bottom punch does not contact the intermediate layer.

4. The method of claim 3, wherein controlling the stamping device includes:

operating the stamping device between an initial position in which the material displacement edges are separated by a distance greater than a thickness of the strip and a stop position in which the material displacement edges are separated by a separation distance less than the thickness of the strip but greater than a thickness of the intermediate layer.

5. The method of claim 4, wherein the separation distance in the stop position is at least five percent greater than the thickness of the intermediate layer.

6. The method of claim 3, wherein controlling the stamping device includes:

preventing a fracture formed in the upper layer by the material displacement edge of the top punch from propagating to the intermediate layer.

7. The method of claim 6, wherein controlling the stamping device further includes:

preventing a fracture formed in the lower layer by the material displacement edge of the bottom punch from propagating to the intermediate layer.

8. The method of claim 1, wherein shearing the strip includes:

controlling the stamping device such that a fracture formed in the upper layer by the top punch is substantially offset by a fracture formed in the lower layer by the bottom punch.

9. The method of claim 1, wherein shearing the strip includes driving the top punch toward the bottom punch.

10. The method of claim 1, wherein providing a stamping device includes:

providing the material displacement edges of the top punch and the bottom punch, respectively, with a rake angle in the range of approximately 20°–70°.

11. The method of claim 10, wherein the rake angle of the material displacement edges is approximately 45°.

12. The method of claim 1, wherein separating the part from the strip includes:

providing a shearing device including a flat punch and a die, the flat punch and the die each being sized in accordance with the desired size of the part;

aligning the part with the die; and directing the punch toward the die to detach the part from the strip along the upper and lower layer groove patterns.

13. The method of claim 1, further including:

flat baking the part following removal from the strip such that the part has a flatness of less than about 8 microns per 96 mm.

14. The method of claim 1, wherein the part is a ring having an outer perimeter and a central hole defining an inner perimeter, and further wherein the material displacement edges of the top and bottom punches, respectively, each include a first section corresponding with the outer perimeter and a second section corresponding with the inner perimeter.

15. A method of stamping a part from an elongated strip of multi-layered material, the multi-layered material including an upper layer, an intermediate layer and a lower layer, the intermediate layer being viscoelastic and the upper and lower layers being relatively rigid with respect to the intermediate layer, the method including:

forming a first groove in the upper layer, the first groove defining a perimeter of the part and having a depth less than a thickness of the upper layer;

forming a second groove in the lower layer, the second groove being symmetrical to the first groove and having a depth less than a thickness of the lower layer;

wherein the first groove and the second groove are substantially simultaneously formed and define a perimeter of the part; and separating the part from the strip, the part having a substantially uniform perimeter edge.

16. The method of claim 15, wherein the first and second grooves are formed by pinching the strip between opposing punches having material displacement edges configured to impart the first and second grooves, respectively.

17. The method of claim 16, wherein the first and second grooves are formed by displacing material of the upper and lower layers, respectively, away from the perimeter of the part.

18. The method of claim 17, wherein each of the material displacement edges is defined by a rake face configured to direct displaced material.

19. The method of claim 18, wherein each of the material displacement edges is further defined by a part interface surface forming a rake angle with the rake face, the rake angle being in the range of approximately 20°–70°.

20. The method of claim 15, wherein formation of the first and second grooves does not result in a fracture propagating to the intermediate layer.

21. The method of claim 15, wherein the first groove and the second groove are each defined by a first side substantially perpendicular to a plane of the strip and a second side forming an acute angle with the first side.

22. The method of claim 15, wherein a retention web extends between the first and second grooves comprised of a portion of the upper layer, the intermediate layer and a portion of the lower layer, and wherein separating the part from the strip includes:

shearing the retention web.

\* \* \* \* \*

UNITED STATES PATENT AND TRADEMARK OFFICE
CERTIFICATE OF CORRECTION

PATENT NO. : 6,401,510 B1
DATED : June 11, 2002
INVENTOR(S) : Morse, Thomas L.

It is certified that error appears in the above-identified patent and that said Letters Patent is hereby corrected as shown below:

<u>Title page,</u>
Item [75], Inventors, "Brian D. Johnson" should read -- Brian L. Johnson --

<u>Column 8,</u>
Lines 32 and 37, "defme" should read -- define --

<u>Column 9,</u>
Line 58, "defme" should read -- define --

<u>Column 10,</u>
Line 59, "19" should read -- 18 --

Signed and Sealed this

Seventeenth Day of June, 2003

JAMES E. ROGAN
*Director of the United States Patent and Trademark Office*